(12) United States Patent
Kobayashi et al.

(10) Patent No.: US 8,307,840 B2
(45) Date of Patent: Nov. 13, 2012

(54) VALVE DEVICE

(75) Inventors: Yasutomo Kobayashi, Yamato (JP);
Itsuo Honda, Kamakura (JP)

(73) Assignee: Nifco Inc., Yokohama-Shi (JP)

( * ) Notice: Subject to any disclaimer, the term of this patent is extended or adjusted under 35 U.S.C. 154(b) by 300 days.

(21) Appl. No.: 12/733,938

(22) PCT Filed: Sep. 30, 2008

(86) PCT No.: PCT/JP2008/067771
§ 371 (c)(1),
(2), (4) Date: Apr. 29, 2010

(87) PCT Pub. No.: WO2009/044750
PCT Pub. Date: Apr. 9, 2009

(65) Prior Publication Data
US 2010/0224265 A1    Sep. 9, 2010

(30) Foreign Application Priority Data
Oct. 2, 2007    (JP) ................ 2007-258648

(51) Int. Cl.
*F16K 24/04*    (2006.01)
*B60K 15/035*   (2006.01)
*F24D 19/08*    (2006.01)
*F02M 37/20*    (2006.01)

(52) U.S. Cl. ............. 137/202; 137/43; 123/516

(58) Field of Classification Search ............ 137/202, 137/43, 199, 197; 123/516
See application file for complete search history.

(56) References Cited

U.S. PATENT DOCUMENTS

| 4,508,131 A | * | 4/1985 | DeFrees ............... 137/43 |
| 5,449,029 A |   | 9/1995 | Harris |
| 5,577,526 A |   | 11/1996 | Kasugai et al. |
| 5,944,044 A |   | 8/1999 | King |
| 6,257,287 B1 | * | 7/2001 | Kippe et al. .......... 141/198 |
| 6,422,261 B1 | * | 7/2002 | DeCapua et al. ...... 137/202 |
| 7,152,586 B2 |   | 12/2006 | Aoki et al. |

FOREIGN PATENT DOCUMENTS

| JP | H11-229984 A | 8/1999 |
| JP | 2004-44525 A | 2/2004 |
| JP | 2006-266096 A | 10/2006 |

* cited by examiner

*Primary Examiner* — Eric Keasel
*Assistant Examiner* — Daphne M Barry
(74) *Attorney, Agent, or Firm* — Manabu Kanesaka

(57) ABSTRACT

A valve device is used by being attached to a fuel tank. The valve device includes a main body portion provided with ventilation openings which become an inner end of a connecting passage with the outside of the fuel tank, a valve body opening and closing the ventilation openings using a liquid surface of a fuel, and a skirt portion extending down from the main body portion so as to surround the valve body, and also constructed so as to admit fuel due to a pressure difference between inside and outside of the fuel tank when the liquid surface of the fuel reaches a cuff portion of the skirt portion.

9 Claims, 6 Drawing Sheets

VALVE DEVICE

FIELD OF THE INVENTION

This invention relates to an improvement of a valve device which is attached to a fuel tank for an automobile, two-wheel vehicle and the like, and functions so as to communicate between the inside and the outside of the fuel tank in an open valve state.

BACKGROUND OF THE ART

As a fuel shutoff valve which is attached to a fuel tank, for controlling a quantity of fuel at the time of fueling, and which functions to prevent overfilling, there is a valve shown in Japanese Patent Document 1. The valve in Japanese. Patent Document 1 includes two valve mechanisms, one on the upper side and one on the lower side. When a fuel liquid level reaches a first liquid level, a first float of the first valve mechanism positioned on the lower side rises due to the inflow of a fuel to the first valve chamber, and closes the first connecting pathway. However, since the first valve chamber is communicated with a side portion inside a fuel tank by a lateral communicating hole, due to fluctuations or ripples on a liquid surface of the fuel at the time of fueling, fuel may inflow into the first valve chamber, even though the fuel has not reached the first liquid level as if there were no fluctuations or ripples. Accordingly, further development is required with respect to controlling the fuelling quantity with high accuracy.

Patent Document 1: Japanese Unexamined Patent Application Publication (TOKKAI) No. 2006-266096

DISCLOSURE OF THE INVENTION

Problems to be Solved by the Invention

A main problem to which the present invention is directed to solving with this type of valve device, is the fueling quantity to the fuel tank at the time of fueling can be controlled with high accuracy.

Means for Solving the Problems

In order to obviate the above-mentioned problem, the present invention is directed to a valve device which is attached to a fuel tank and which includes, a main body portion provided with a ventilation opening which becomes an inner end of a connecting passage to the exterior of the fuel tank; a valve body opening and closing the ventilation opening in response to a liquid level of a fuel; and a skirt portion extending down from the main body portion so as to surround the valve body, and also constituted so as to surround the fuel on the inside due to a pressure difference between the inside and the exterior of the fuel tank when the liquid surface of the fuel reached a cuff portion.

In a state wherein the ventilation opening is not blocked by the valve body, the interior and exterior of the fuel tank are communicated due to the connecting passage, and also in this state, filling the fuel tank is possible. If the liquid surface of the fuel reaches the cuff portion of the skirt portion, it causes a pressure difference between the interior and the exterior of the fuel tank. Accordingly, the fuel is taken into the skirt portion, inwardly positioning the ventilation opening which is an inner end of the connecting passage, via being suctioned up, and the valve body immediately blocks the ventilation opening due to the fuel inducted in such manner. Even if a portion of the liquid surface contacts the outer side portion of the skirt portion, or contacts the cuff portion due to fluctuations and the like of the liquid surface of the fuel inside the fuel tank, the fuel is never taken into the skirt portion. Thereby, when the liquid surface of the fuel reaches the level of the cuff portion of the skirt portion due to fueling, the valve body can accurately block the ventilation opening, and raise the pressure inside the fuel tank, so that a sensor on a fueling gun side can detect fill-up, and allow fueling to be stopped. Fill-up is never improperly detected at a stage wherein a desired fuel quantity is sensed in response to the fluctuations of the liquid surface at the time of fueling or ripples on the liquid surface resulting from fueling speed. Since the skirt portion is made by opening the lower side, the lower end of the valve device becomes the cuff portion of the skirt portion, and the valve device can be compactly constructed in a vertical direction.

If the valve body is structured by the first valve body blocking the first opening due to a rise, and the second valve body blocking the second opening due to the rise when the liquid surface of the fuel reaches a level higher than the level which allows the first valve body to rise, at the time of fueling, at the stage wherein the first valve body blocks the first opening, the sensor on the fueling gun side can detect the first fill-up. Also, after the fueling is stopped due to the first fill-up detection, the pressure inside the fuel tank descends via the second opening, so that the detection of the fill-up can be released, and after this release, additional fueling is possible until the second valve body blocks the second opening.

In this case, additionally, if the skirt portion is constituted by the first skirt portion surrounding the first valve body, and a second skirt portion surrounding the second valve body and also positioning the cuff portion on the upper side than the cuff portion of the second skirt portion, when the liquid surface of the fuel reaches a level higher than the level which allows the first valve body to rise, the fuel is taken via suctioning into the second skirt. Due to the fuel which is taken in this manner, the second valve body can immediately block the second ventilation opening, and a second fill-up, i.e., the limit of the fueling can be accurately detected by the sensor on the fueling gun side with a few time lags.

If such valve body is supported on the lower side of the main body portion so as to be movable up and down, and constituted as a float body blocking the ventilation opening of the main body portion due to the rise, when the fuel is not taken into the skirt portion, the valve body can descend due to its own weight, and maintain an open state of the ventilation opening. On the other hand, when the fuel is taken into the skirt portion, the valve body can rise due to flotation, and block the ventilation opening. If the valve body is supported in a portion of formation of such ventilation opening in the inward of the skirt portion in a suspended manner, the valve device can be compactly constituted in the vertical direction compared to the case wherein the valve body is supported by providing a lid plate and the like on the lower end of the valve device.

If the main body portion is provided with a valve chamber in which the valve body which operates to block the connecting passage when a tilt of a certain amount or above occurs in a vehicle additionally on a down stream side of the ventilation opening in the connecting passage, is housed, the valve device including a function of promptly closing the ventilation opening only when the liquid surface of the fuel reaches the cuff portion of the skirt portion, can additionally and rationally include a function which does not allow the fuel to leak to the outside via the connecting passage when the tilt of a certain amount or above occurs in the vehicle. In the disclosure of Japanese Patent Document 1, the fuel is always taken via the first valve chamber when a fuel liquid level reaches a second liquid level even in the second valve chamber on the first valve chamber. Such second valve chamber is not provided for the purpose of preventing the fuel from leaking to the outside via the connecting passage when a tilt with a certain amount or above occurs in such vehicle.

Effects of the Invention

According to the valve device of the present invention, provided that the liquid surface of the fuel does not reach the cuff portion of the skirt portion, the fuel is not taken into the skirt portion, and also, when the liquid surface of the fuel reaches the cuff portion of the skirt portion, the fuel is taken via suctioning into the skirt portion. Accordingly, the ventilation opening which makes the inner end of the connecting passage can be immediately blocked by the valve body, so that the fueling quantity at the time of fueling to the fuel tank can be controlled with high accuracy.

BEST MODE FOR CARRYING OUT THE INVENTION

Hereinafter, the best mode for carrying out the present invention will be explained with reference to FIGS. 1 to 6.

Figure 1:
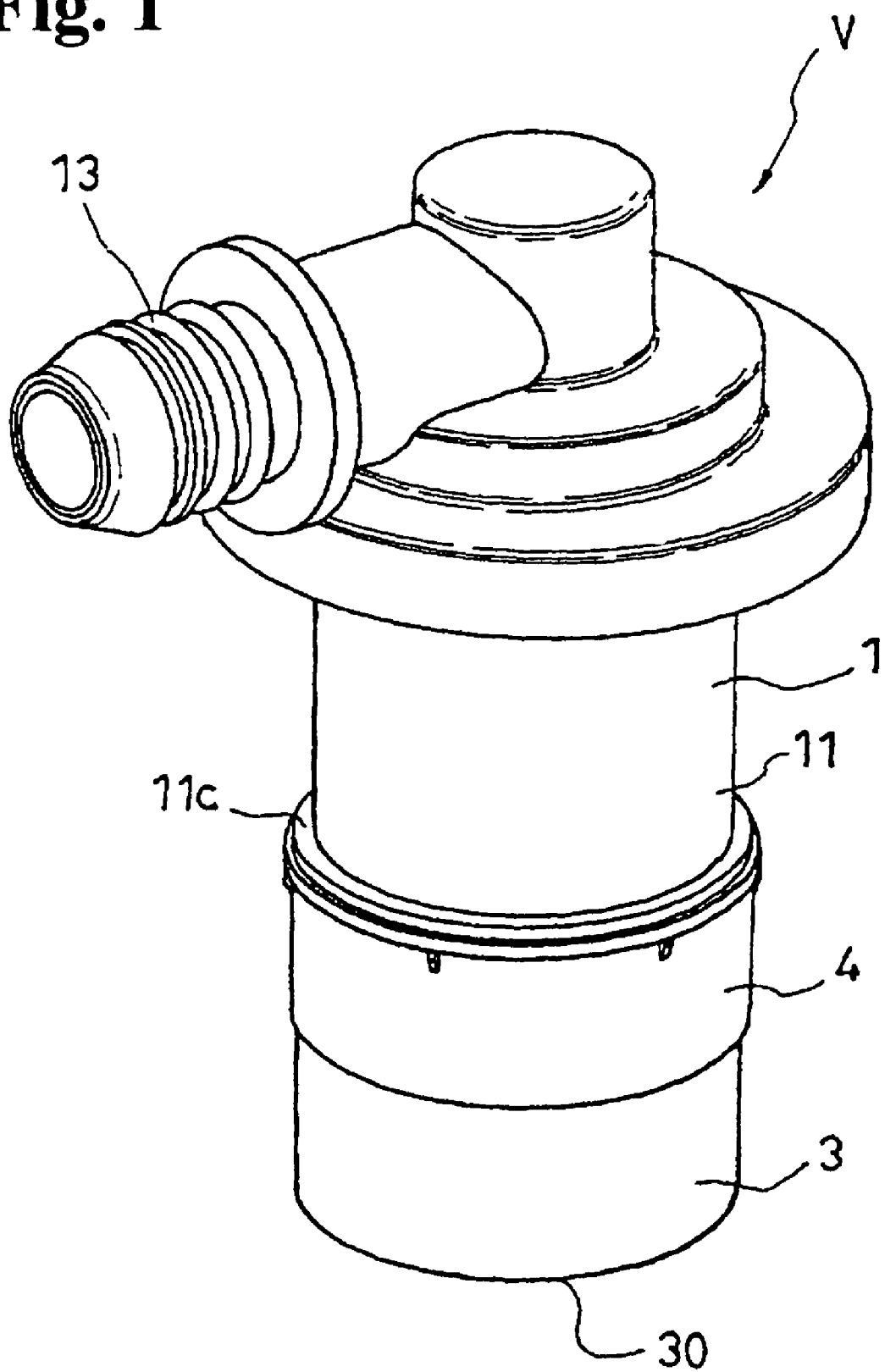
FIG. 1 is a perspective sectional view of a valve device according to a first embodiment of the present invention.
Figure 2:
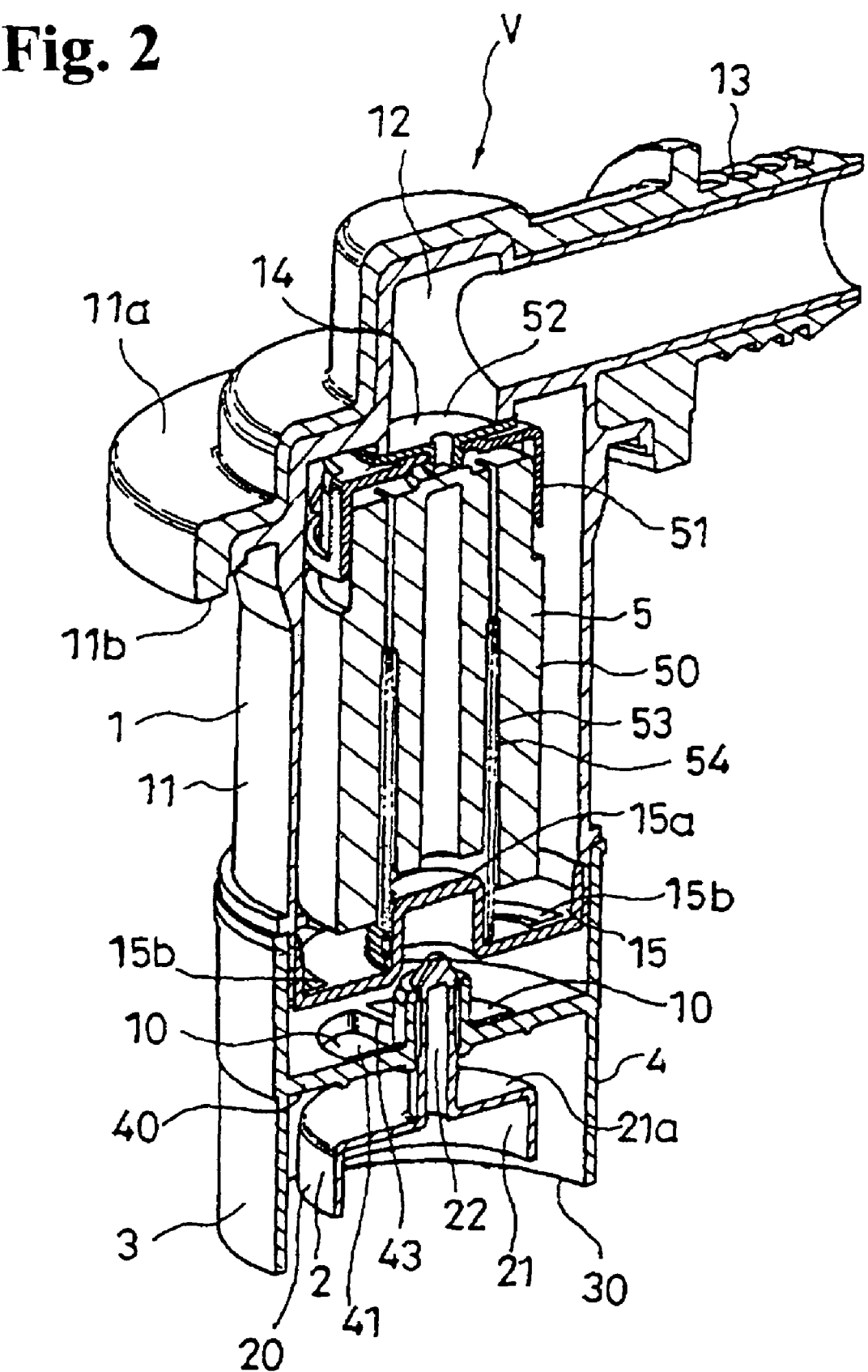
FIG. 2 is a cross-sectional view of the first embodiment.
Figure 3:
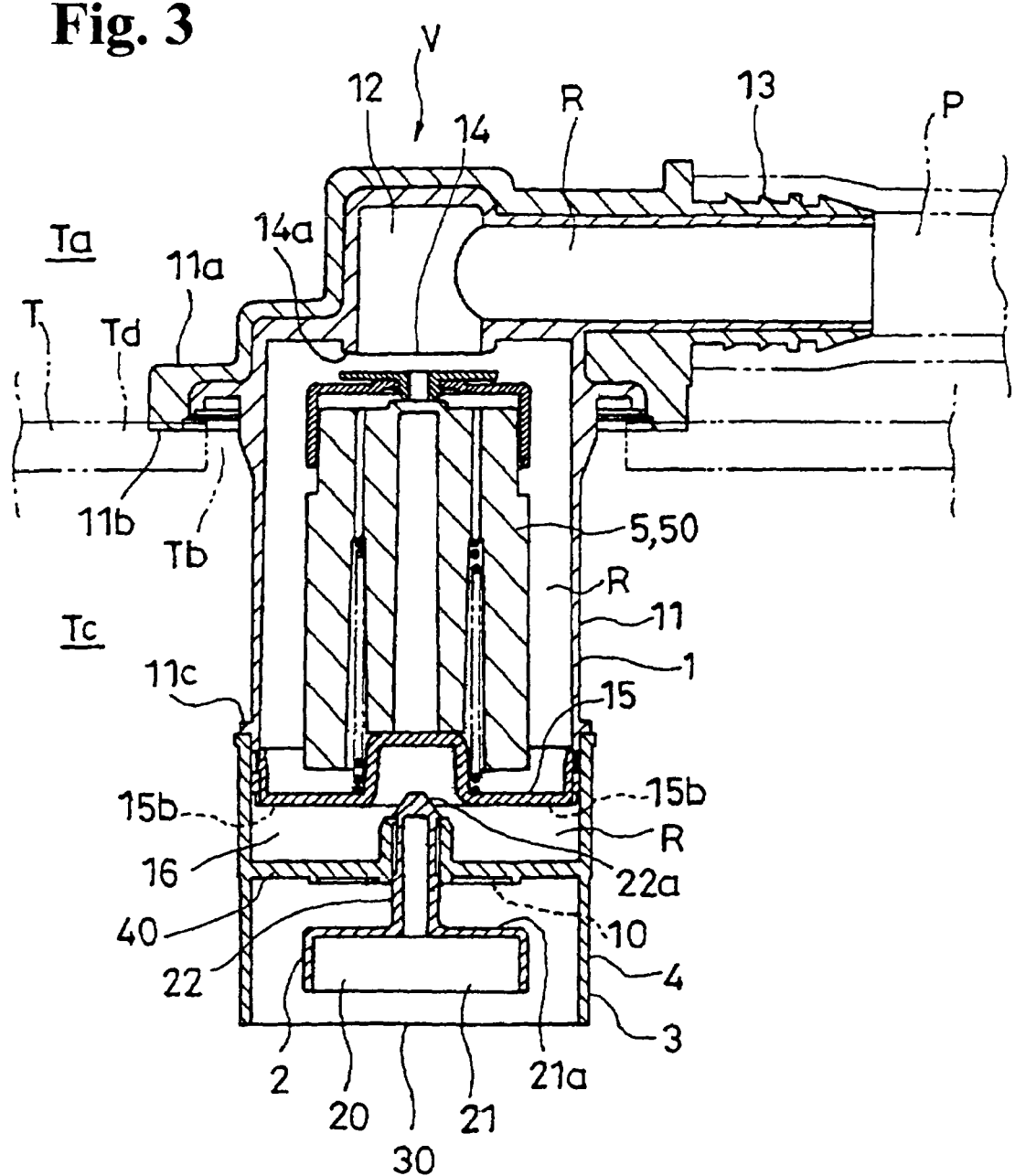
FIG. 3 is a cross-sectional view showing the first embodiment in a state of use.
Figure 4:
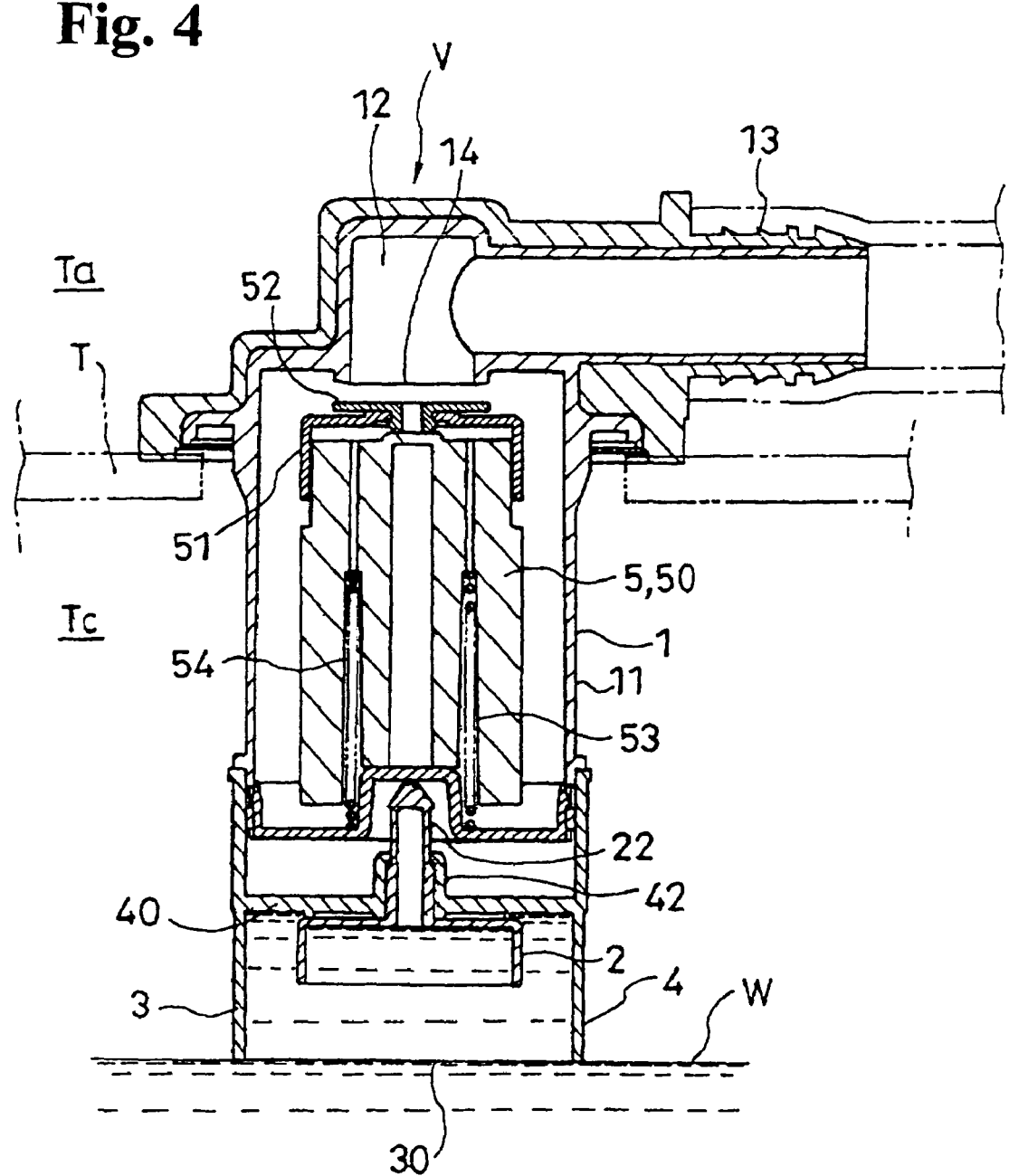
FIG. 4 is a cross-sectional view showing the first embodiment in another used state.

Incidentally, here, FIG. 1 shows an external structure of a valve device V according to a first embodiment, and FIG. 2 shows an internal structure thereof. FIG. 3 shows an open valve state when a liquid surface W of a fuel does not reach a cuff portion 30 of a skirt portion 3, and FIG. 4 shows a closed valve state when the liquid surface W of the fuel reaches the cuff portion 30 of the skirt portion 3, respectively.

Figure 5:
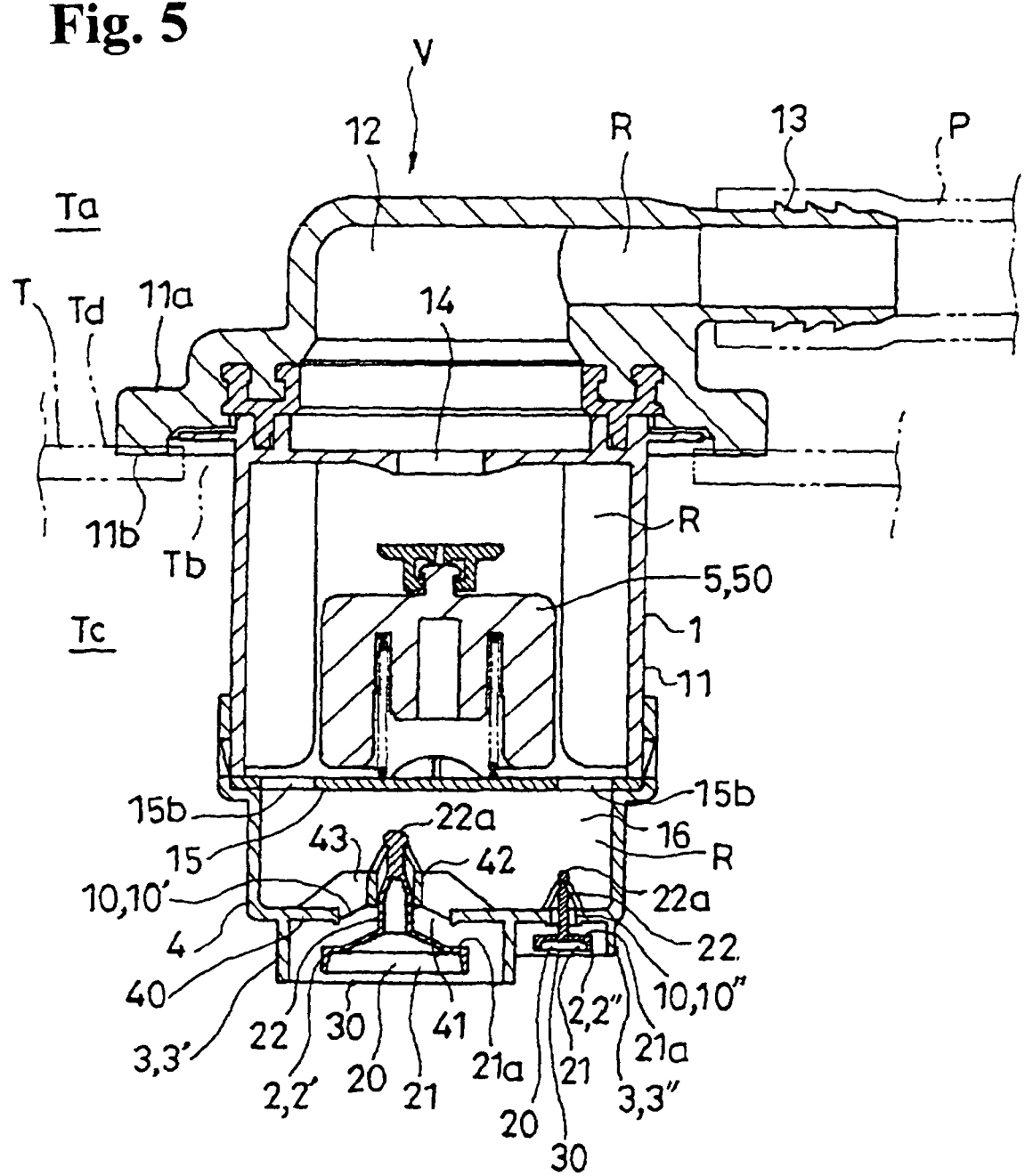
FIG. 5 is a cross-sectional view showing a used state of another embodiment of the valve device.
Figure 6:
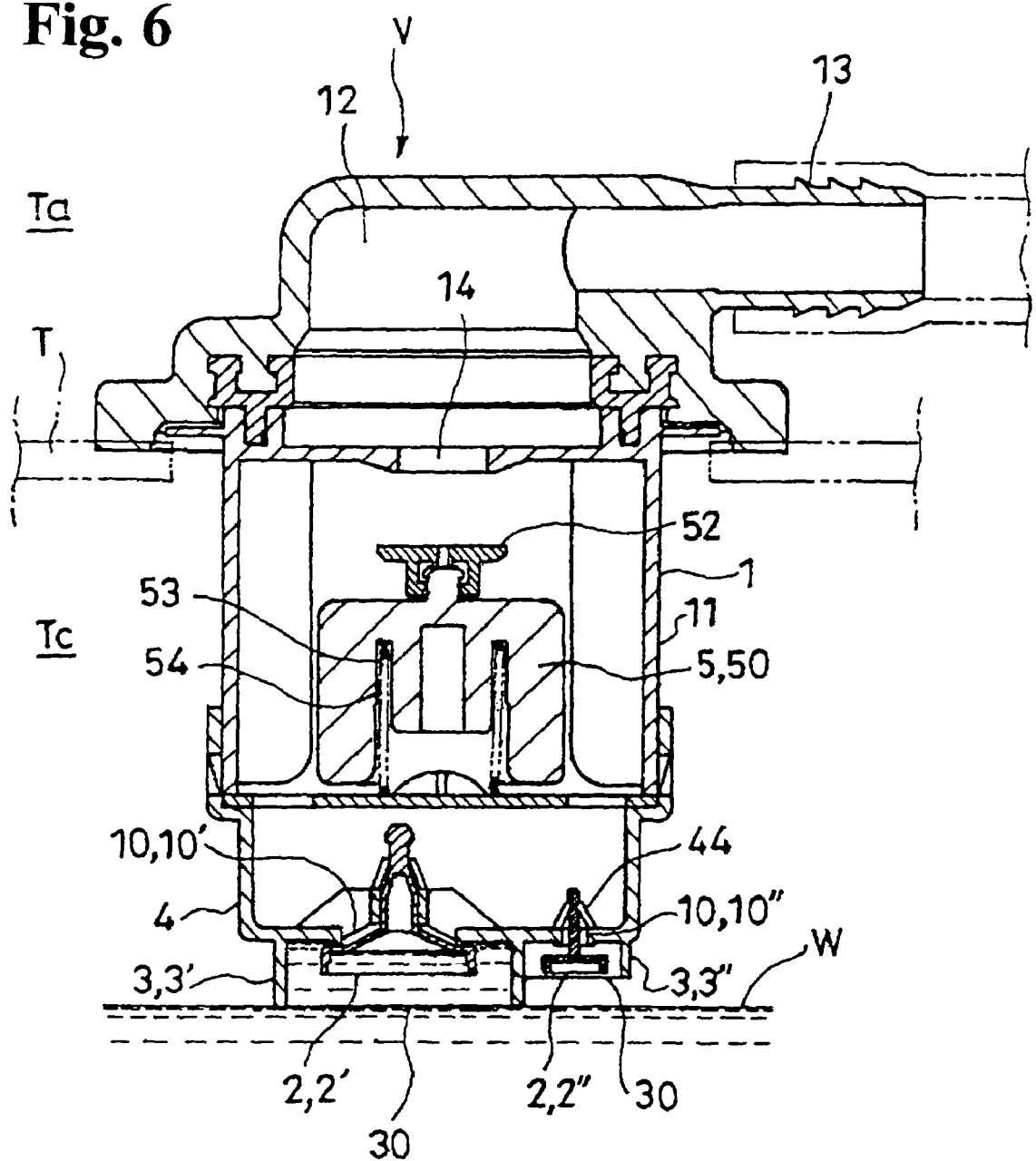
FIG. 6 is a cross-sectional structural view showing a used state of the embodiment shown in FIG. 5.

Also, FIGS. 5, 6 show an embodiment wherein one portion of the structure of the valve device V shown in FIGS. 1 to 4 is modified, FIG. 5 shows the open valve state wherein the liquid surface W of the fuel does not reach the cuff portion 30 of the skirt portion 3, and FIG. 6 shows the closed valve state of the first opening 10' wherein the liquid surface W of the fuel reaches the cuff portion 30 of the first skirt portion 3, respectively.

The valve device V according to the embodiment is attached to a fuel tank T for an automobile, two-wheel vehicle, and the like, and functions so as to communicate between inside and outside of the fuel tank T in the open valve state.

Such valve device V is typically attached to the upper portion of the fuel tank T, and constitutes a portion of a connecting passage R (ventilation pass) relative to the fuel tank T.

In an illustrated embodiment, such valve device V allows fueling to the fuel tank T, and also when the liquid surface W of the fuel inside the fuel tank T reaches a predetermined level, the valve device V assumes a closed valve state, raises the pressure inside the fuel tank T, and thereby, functions to allow a sensor on a fueling nozzle side to detect fill-up and halt the fueling, and is used as i.e., a vent valve.

Such valve device V comprises a main body portion 1, valve body 2, and the skirt portion 3.

The main body portion 1 comprises ventilation openings 10 which become an inner end of a connecting passage R which extends outside Ta of the fuel tank T. In the illustrated embodiment, such main body portion 1 comprises a cylindrical trunk portion 11. The trunk portion 11 integrally comprises a flange 11a on the outside. Also, the trunk portion 11 is communicated with a connecting pipe body 13 extending in a direction approximately perpendicular to the trunk portion 11 on the upper side of the flange 11a via an upper side chamber 12. A communicating portion 14 between the upper side chamber 12 and the trunk portion 11 is rimmed with a circular rib 14a projecting toward the lower side. On the lower end of the trunk portion 11, a lower portion part 4 wherein the lower side of a divider plate 40 is the skirt portion 3 described hereinafter, is attached. The lower portion part 4 has a cylindrical shape whose both cylindrical ends are open, and also comprises the divider plate 40 in an appropriately middle position between the cylindrical ends. Ventilation openings 10 are formed in the divider plate 40 of such lower portion part 4. In the illustrated embodiment, such divider plate 40 is disposed with a supporting tube body 42 projecting to the upper side in the center of a circular through-bore 41, and also includes a structure allowing supporting pieces 43 of the supporting tube body 42 to be disposed so as to bridge between the supporting tube body 42 and the bore border of the through-bore 41 at an approximately 90 degrees interval in a direction circling the supporting tube body 42. Also, spaces between the adjacent supporting pieces 43, function as the ventilation openings 10. The inner diameter of the lower portion part 4 has an approximately equal external diameter of the trunk portion 11, and the upper end of the lower portion part 4 is interiorly inserted into the lower end of the trunk portion 11. Also, the lower portion part 4 is integrated with the trunk portion 11 by firmly fixing an inserted portion by welding and the like. On the outside of the lower end of the trunk portion 11, a control projection 11c which controls the amount of insertion of the lower end of the trunk portion 11 into the lower portion part 4 by abutting the upper end of the lower portion part 4, is formed. Thereby, the main body portion 1 is communicated with an inside Tc of the fuel tank T only via the lower end of the lower portion part 4, i.e., the cuff portion 30 of the skirt portion 3, and is communicated with the outside Ta of the fuel tank T in the connecting pipe body 13. The rest of the structure is constructed so as to be liquid-tight.

Also, a bottom plate 15 is fitted into the lower end of the trunk portion 11. The bottom plate 15 comprises a short-sized column portion 15a projecting toward the upper side in the central portion. The short-sized column portion 15a is hollow, and an inner space thereof opens at the lower side. A suspending shaft 22 of the valve body 2 described hereinafter is inserted into the inner space thereof when the suspending shaft 22 rises. A space which becomes a portion of the connecting passage R is ensured between such bottom plate 15 and the divider plate 40 of the lower portion part 4, and also a through-bore 15b which becomes a portion of the connecting passage R is formed in an outer circumferential portion of the bottom plate 15.

A valve body 5 having a size so as to be movable up and down inside the trunk portion 11 is housed between the communicating portion 14 with the upper side chamber 12 in the trunk portion 11 and the bottom plate 15. This valve body 5 comprises a columnar float body 50, and a seal body 52 combined with the float body 50 via a cap 51 attached to the upper end portion of the float body 50. In the valve body 5, an annular space 53 whose lower side is open, is formed. Inside the annular space 53, a compression coil spring 54 whose lower end is fixed to the bottom plate 15 so that the short-sized column portion 15a of the bottom plate 15 enters into the lower end side of the spring, is housed. A certain amount of urging force to the upper side acts on the float body 50 by the spring 54 housed in such manner. Then, in the illustrated embodiment, usually, the valve body 5 is in a descended position allowing the lower end of the float body 50 to contact with the bottom plate 15, and a communicated state between inside and outside of the fuel tank T which is communicated with the ventilation openings 10, the through-bore 15b, and the communicating portion 14, is maintained. (FIG. 3) At the same time, when a tilt with a certain amount or above occurs in a vehicle, and the fuel inflows into the trunk portion 11 via the ventilation openings 10 and the through-bore, due to this fuel, such valve body 5 moves to a position blocking the communicating portion 14 between the upper side chamber 12 and the trunk portion 11 by the seal body 52. (FIG. 2) Concretely, in such case, the seal body 52 is attached firmly to the circular rib 14a.

Specifically, in the illustrated embodiment, the main body portion 1 comprises the valve chamber to which the valve body 5 operating so as to block the connecting passage R is housed when the tilt with a certain amount or above occurs on the vehicle on a down stream side of the ventilation openings 10 in the connecting passage R. Thereby, in this embodiment thereof, additionally, the valve device V including a function promptly closing the ventilation openings 10 only when the liquid surface W of the fuel reaches the cuff portion 30 of the skirt portion 3 described hereinafter, reasonably includes a function which does not allow the fuel to leak to the outside via the connecting passage R when the tilt with a certain amount or above occurs in the vehicle. In the illustrated embodiment, a circular welding projection 11b projecting to the lower side is formed in the flange 11a of the main body portion 1, and in a state wherein the lower side of the flange 11a is inserted into the inside Tc of the fuel tank T through an attachment open portion Tb which is formed in the fuel tank T, the welding projection 11b is welded to an external surface portion Td of the fuel tank T, so that the valve device V is attached to the fuel tank T. A connecting pipe P which leads to a canister or the like is connected to the connecting pipe body 13.

The valve body 2 is constructed so as to open and close the ventilation openings 10 using the liquid surface W of the fuel. In the embodiment, such valve body 2 is supported on the lower side of the main body portion 1 so as to be movable up and down, and also constructed as a float body 20 blocking the ventilation openings 10 of the main body portion 1 due to a rise in fuel. Thereby, in the embodiment, when the fuel is not taken into the skirt portion 3 described hereinafter, the valve body 2 descends due to its own weight, and maintains an open state of the ventilation openings 10 (FIG. 3). On the other hand, when the fuel is taken into the skirt portion 3, the valve body 2 can rise due to flotation, and block the ventilation openings 10. (FIG. 4)

In the illustrated embodiment, such valve body 2 comprises a short-sized tube portion 21 whose upper end is blocked and whose lower end is open; and the suspending axis 22 whose lower end is integrally connected with the approximately center of a closed tube upper end surface 21a of the short-sized tube portion 21, and which projects to the upper side. The suspending shaft 22 is hollow and communicated with only the space inside the short-sized tube portion 21. A head portion 22a having a conical shape with a cut-out head portion is formed on the upper end of the suspending shaft 22, and the external diameter of the lower end of the head portion 22a is slightly larger than the internal diameter of the upper end side of the supporting tube body 42 of the divider plate 40 of the lower portion part 4. Then, in the illustrated embodiment, the suspending shaft 22 can be inserted into the supporting tube body 42 of the divider plate 40 of the lower portion part 4 from the lower side so as to be in the position wherein the head portion 22a of the suspending shaft 22 is projected from the upper end of the supporting tube body 42 due to an elastic deformation of both the suspending shaft 22 and the supporting tube body 42 or either one of those. Due to this insertion, the valve body 2 is supported by the lower portion part 4 to be movable up and down between a descending position (FIG. 3) wherein the head portion 22a of the suspending shaft 22 is engaged with the upper end of the supporting tube body 42 and a rising position (FIG. 4) wherein the tube upper end surface 21a of the short-sized tube portion 21 is contacted with the lower surface of the divider plate 40. An external border of the tube upper end surface 21a of the valve body 2 is positioned on the outside of the external border of the ventilation openings 10. In the rising position of the valve body 2, the ventilation openings 10 are blocked, and the connecting passage R is closed. (FIG. 4)

The skirt portion 3 extends to the lower side from the main body portion 1 so as to surround such valve body 2, and also is constituted so as to take the fuel to the inside due to a pressure difference between inside and outside of the fuel tank T when the liquid surface W of the fuel reaches the cuff portion 30.

In the illustrated embodiment, the skirt portion 3 is constructed by portions on the lower side of the ventilation openings 10 of the lower portion part 4 which is attached to the trunk portion 11 and allows the main body portion 1 to form the ventilation openings 10. The skirt portion 3 has a cylindrical shape whose lower end is open. Also, the cuff portion 30 is positioned on the lower side of the lower end of the valve body 2 which is in the descending position, and also is positioned in an imaginary straight line which is orthogonal to a tube axis line of such cylinder. The skirt portion 3 is open to the inside of the fuel tank T only at the cuff portion 30.

In a state wherein the ventilation openings 10 are not blocked by the valve body 2, inside and outside of the fuel tank T are communicated by the connecting passage R, and also in this state, the fueling to the fuel tank T is possible. When the liquid surface W of the fuel reaches the cuff portion 30 of the skirt portion 3, the pressure difference between inside and outside of the fuel tank T occurs, so that the fuel is taken into the skirt portion 3, wherein the ventilation openings 10 which are the inner end of the connecting passage R are positioned in the inner side, via being suctioned up. Due to the presence of the fuel, the valve body 2 immediately blocks the ventilation openings 10. Due to fluctuations and the like of the liquid surface W of the fuel inside the fuel tank T, even if a portion of the liquid surface contacts with the outside portion of the skirt portion 3 or contacts with the cuff portion 30, the fuel is never taken into the skirt portion 3. Thereby, in the valve device V according to the embodiment, when the liquid surface W of the fuel reaches the level of the cuff portion 30 of the skirt portion 3 due to the fueling, the valve device V functions so as to accurately block the ventilation openings 10 by the valve body 2, raise the pressure inside the fuel tank T, allow the sensor on the fueling gun side to detect the fill-up, and halt the fueling. In response to fluctuations on the liquid surface at the time of fueling, ripples on the liquid surface caused by a fueling speed, and the like, the sensor never detects the fill-up at a stage wherein a desired fueling quantity has not been reached. Since the skirt portion 3 is open at the lower side, the lower end of the valve device V becomes the cuff portion 30 of the skirt portion 3, and compared to the case wherein the valve body 2 is supported by providing a lid plate and the like on such lower end, the valve device V can be compactly constructed in a vertical direction. Also, in the case of providing the main body portion 1 with the skirt portion 3 by combining the parts constituting the skirt portion 3 with a part (the trunk portion 11 in the illustrated embodiment) constituting an essential part of the main body portion 1, the fueling quantity which indicates fill-up can be adjusted only by replacing the parts constituting such skirt portion 3.

FIGS. 5, 6 show an embodiment wherein the ventilation openings 10 are constituted by the first opening 10', and a second opening 10" whose opening area is smaller than that of the first opening 10'. Also, the valve body 2 is constituted by the first valve body 2' blocking the first opening 10' due to the rise, and a second valve body 2" blocking the second opening 10" due to the rise when the liquid surface W of the fuel reaches the level higher than the level (level in FIG. 6) which rises the first valve body 2'.

In such case, at the time of fueling, the first fill-up can be detected by the sensor on the fueling gun side at the stage wherein the first valve body 2' blocks the first opening 10'. Also, since the pressure inside the fuel tank T is reduced through the second opening 10" after the fueling halts due to the detection of this first fill-up, the release of the detection of the fill-up is possible, and after this release, additional fueling is possible until the second valve body 2" blocks the second opening 10".

Also, in the illustrated embodiment shown in FIGS. 5, 6, the skirt portion 3 is constituted by the first skirt portion 3' surrounding the first valve body 2', and a second skirt portion 3" surrounding the second valve body 2" and also positioned the cuff portion 30 thereof in the upper side than the cuff portion 30 of the second skirt portion 3.

Thereby, in this embodiment, when the liquid surface W of the fuel reaches the level higher than the level rising the first valve body 2', the fuel is taken into the second skirt portion 3" via being suctioned up, and due to the fuel taken in such manner, the second valve body 2" immediately blocks the second ventilation openings 10, so that a second fill-up, i.e., the limit of the fueling can be accurately detected by the sensor on the fueling gun side with very little time lag.

In the embodiment shown in FIGS. 5, 6, the structure of the lower portion part 4 especially differs from that of the embodiment in FIGS. 1 to 4. In this embodiment, the first opening 10' and the second opening 10" are formed in a penetrating state by providing a space in the divider plate 40 of the lower portion part 4 in a horizontal direction. The second valve body 2" is supported so as to be movable up and down in such a way as to hook the head portion 22*a* of the suspending axis 22 on a supporting piece 44 projecting to the upper side from a border portion of the second opening 10". The first skirt portion 3' is constructed so as to form a cylindrical shape surrounding the first valve body 2'. The second skirt portion 3" is constituted so as to position the cuff portion 30 in the upper side of the cuff portion 30 of the first skirt portion 3', and also to surround the second valve body 2" together with a portion of an external surface of the first skirt portion 3'. The rest of the structure in the embodiment shown in FIGS. 5, 6 is substantially the same as structural parts corresponding to those of the embodiment shown in FIGS. 1 to 4, so that the same symbols used in FIGS. 1 to 4 are assigned to the same parts in FIGS. 5, 6, and their explanations are omitted.

Incidentally, the specification, claims, drawings, and abstract of Japanese Patent Application No. 2007-258648 filed on Oct. 2, 2007 are cited in their entirety herein and are incorporated as a disclosure of the specification of the present invention.

What is claimed is:

1. A valve device for use with a fuel tank, comprising:
    a main body portion having a ventilation opening communicating with a connecting passage to an outside of the fuel tank;
    a valve body opening and closing the ventilation opening according to a liquid surface of a fuel in the fuel tank, said valve body having a shape with a closed upper end and an open lower end, and a suspending shaft extending upwardly from the closed upper end so that the valve body is slidably suspended in a vertical direction by the suspending shaft; and
    a skirt portion extending down from the main body portion so as to surround the valve body with a space relative to the valve body, so that when the valve body is located at a lower position, a gas inside the fuel tank passes through the ventilation opening and the space between the skirt portion and the valve body, and when the liquid surface of the fuel reaches the cuff portion of the skirt portion, the fuel is taken into the skirt portion due to a pressure difference between inside and outside of the fuel tank and the ventilation opening is closed by the valve body raised by the fuel taken into the skirt portion.

2. A valve device according to claim 1, wherein the ventilation opening includes a first opening and a second opening having an opening area smaller than that of the first opening, and
    wherein the valve body includes a first valve body blocking the first opening due to a fuel level rise, and a second valve body blocking the second opening due to the fuel level rise when the liquid surface of the fuel reaches a level higher than the level which allows the first valve body to rise.

3. A valve device according to claim 2, wherein the skirt portion includes a first skirt portion surrounding the first valve body, and a second skirt portion surrounding the second valve body and having a cuff portion above a cuff position of the first skirt portion.

4. A valve device according to claim 1, wherein the valve body is supported on a lower side of the main body portion to be movable up and down, and also is a float body blocking the ventilation opening of the main body portion due to rise of the float body.

5. A valve device according to claim 1, wherein the main body portion includes a valve chamber, and another valve body disposed in the valve chamber, operating so as to block the connecting passage, when a tilt with a certain amount or above occurs in a vehicle, said valve chamber being location on a down stream side of the ventilation opening in the connecting passage.

6. A valve device according to claim 1, wherein said skirt portion has a cylindrical shape with a cuff portion so that the skirt portion is open to an inside of the fuel tank only at the cuff portion.

7. A valve device according to claim 6, wherein the main body portion includes a divider plate for dividing the main body portion, said divider plate having said ventilation opening and a supporting tube body extending upwardly therefrom in a center thereof, said suspending shaft being slidably disposed in the supporting tube body.

8. A valve device according to claim 7, wherein said suspending shaft includes a head portion having a size greater than that of the suspending shaft so that the valve body is suspended by the divider plate.

9. A valve device according to claim 8, wherein the closed upper end of the valve body has a size such that when the valve body is moved to an upper position in the skirt portion, the closed upper end of the valve body closes the ventilation opening.

* * * * *